(12) United States Patent
Li et al.

(10) Patent No.: US 6,291,351 B1
(45) Date of Patent: Sep. 18, 2001

(54) ENDPOINT DETECTION IN CHEMICAL-MECHANICAL POLISHING OF CLOISONNE STRUCTURES

(75) Inventors: Leping Li, Poughkeepsie; Steven George Barbee, Amenia, both of NY (US); Eric James Lee; Francisco A. Martin, both of San Jose, CA (US); Cong Wei, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/605,729

(22) Filed: Jun. 28, 2000

(51) Int. Cl.[7] ................................................. H01L 21/302
(52) U.S. Cl. ............................................................. 438/692
(58) Field of Search ................................... 438/692, 693, 438/700, 750, 751, 754, 5, 14

(56) References Cited

U.S. PATENT DOCUMENTS

| | | | |
|---|---|---|---|
| 3,502,711 | * 3/1970 | Skala | 23/232 |
| 5,069,008 | 12/1991 | Sandhu et al. | 52/80 |
| 5,213,655 | 5/1993 | Leach et al. | 156/627 |
| 5,242,532 | * 9/1993 | Cain | 156/626 |
| 5,492,594 | 2/1996 | Burke et al. | 216/86 |
| 5,531,016 | 7/1996 | Postma et al. | 29/603.16 |
| 5,595,526 | 1/1997 | Yau et al. | 451/8 |
| 5,663,637 | 9/1997 | Li et al. | 324/71.5 |
| 5,770,948 | 6/1998 | Li et al. | 324/226 |
| 5,795,495 | 8/1998 | Meikle | 216/88 |
| 6,021,679 | 2/2000 | Li et al. | 73/863.23 |
| 6,066,564 | 5/2000 | Li et al. | 438/692 |
| 6,126,848 | 10/2000 | Li et al. | 216/85 |
| 6,180,422 | * 1/2001 | Li et al. | 438/5 |
| 6,194,230 | * 2/2001 | Li et al. | 438/5 |

* cited by examiner

Primary Examiner—David Nelms
Assistant Examiner—Quoc Hoang
(74) Attorney, Agent, or Firm—Jay H. Anderson

(57) ABSTRACT

A method is described for fabricating a cloisonné structure, in which a top surface of a metal oxide layer is made coplanar with a top surface of a metallic structure formed on a substrate. A nitride layer is deposited on at least the top surface of the metallic structure, and the metal oxide layer is deposited over the metallic structure and the nitride layer. The metal oxide layer is then polished by a chemical-mechanical polishing (CMP) process using a slurry, to expose the nitride layer on the top surface of the metallic structure. Polishing of the nitride layer causes ammonia to be generated in the slurry. The ammonia is extracted as a gas from the slurry, and a signal is generated in accordance with the ammonia concentration. The CMP process is terminated in accordance with a change in the signal. In a preferred embodiment, the metal oxide is aluminum oxide, the nitride is aluminum nitride, and the nitride layer is deposited as a conformal layer on the substrate and the metallic structure.

14 Claims, 5 Drawing Sheets

ENDPOINT DETECTION IN CHEMICAL-MECHANICAL POLISHING OF CLOISONNE STRUCTURES

FIELD OF THE INVENTION

This invention relates to the fabrication of read/write heads for magnetic storage devices, and more particularly to improvement of process control in chemical-mechanical polishing (CMP) processes used in fabrication of such heads.

BACKGROUND OF THE INVENTION

In the field of semiconductor processing, chemical-mechanical polishing (CMP) is a widely used technique for planarization of material and controlled removal of a layer of material from a stack of films on a substrate. In a typical CMP process, a film is selectively removed from a semiconductor wafer by rotating the wafer against a polishing pad (or moving the pad against the wafer, or both) with a controlled amount of pressure in the presence of a slurry. FIG. 1 shows a typical CMP apparatus 10 in which a workpiece 100 (such as a silicon wafer with one or more layers deposited thereon) is held face down by a wafer carrier 11 and polished using a polishing pad 12 located on a polishing table 13; the workpiece is in contact with slurry 14. The wafer carrier 11 is rotated by a shaft 15 driven by a motor 16. The entire surface of the workpiece is polished by the polishing pad in the presence of the slurry. Accordingly, surface irregularities are removed from the films deposited on the substrate, and a high degree of planarization is obtained. CMP has been used to remove and/or planarize a wide variety of materials from a stack of films on silicon substrates, including polysilicon, silicon oxides and silicon nitride.

More recently, CMP has been used in a cloisonné process in the fabrication of a magnetic read/write head. This process involves polishing of an aluminum oxide ($Al_2O_3$) film. As shown in FIG. 2A, a layer 22 of aluminum oxide is deposited over small structures 21 of NiFe; the NiFe structures 21 are disposed on an underlying structure 1, which may be a substrate or a stack of films. The aluminum oxide layer 22 is then planarized and removed by CMP until the top surface 21a of each NiFe structure 21 is exposed (see FIG. 2B). A cloisonné pattern is thus obtained, with the top surface of the $Al_2O_3$ layer 22 coplanar with the top surface of the NiFe structures 21.

In CMP processes generally, it is extremely important to stop the process at a desired predetermined location in the film or stack of films (that is, when the endpoint has been reached). Overpolishing (removing too much) of a film renders the workpiece unusable for further processing, thereby resulting in yield loss. Underpolishing (removing too little) of the film requires that the CMP process be repeated, which is tedious and costly. Underpolishing may sometimes go unnoticed, which also results in yield loss. In the above-described cloisonné process, it is particularly important to maintain tight tolerances on the thickness of structures 21, while assuring that enough of the aluminum oxide layer is removed to expose surface 21a.

In a conventional approach to the CMP endpoint detection problem, the thickness of the layer to be removed and the polishing rate are measured for each workpiece, in order to determine a desired polishing time. The CMP process is simply run for this length of time, and then stopped. Since many different factors influence the polishing rate, and the polishing rate itself can change during a process, this approach is far from satisfactory. In particular, the polishing rate of a film generally changes substantially near an interface; this further compounds the problem of predicting the desired polishing time.

Furthermore, as shown in FIG. 2B, the desired cloisonné structure has a very small pattern factor; that is, polishing of the aluminum oxide layer 22 must continue until the NiFe surface 21a is exposed, but the total exposed NiFe area is only about 2% of the total $Al_2O_3$/NiFe interface area.

Application of CMP processing to head technology therefore requires a CMP endpoint detection technique which is effective with materials such as $Al_2O_3$ and NiFe. In addition, it is desirable that the CMP endpoint be detected in situ and in real time; that is, not rely on external measurements such as the current drawn by shaft motor 16 or on extrapolation from previous layer thickness measurements.

SUMMARY OF THE INVENTION

The present invention enables the use of CMP in head fabrication by providing a real-time, sensitive, high-resolution endpoint detection technique for use in the CMP removal of metal oxide films.

In the CMP endpoint detection method of the present invention, an aluminum nitride (AlN) film is embedded as an endpoint-indicating tag in the aluminum oxide where endpoint is desired (e.g. on top of the NiFe structure 21 shown in FIG. 2A). Reaction of the AlN with the slurry produces a distinct product, namely ammonia ($NH_3$), which is then extracted from the slurry and used as a tag to signal the endpoint of the CMP process.

According to a first aspect of the invention, a method of fabricating a cloisonné structure (in which a top surface of a metal oxide layer is made coplanar with a top surface of a metallic structure formed on a substrate) is provided. A nitride layer is deposited on at least the top surface of the metallic structure, and the metal oxide layer is deposited over the metallic structure and the nitride layer. The metal oxide layer is then polished by a chemical-mechanical polishing (CMP) process using a slurry and a suitable polishing pad (optimizing removal rate and polishing uniformity while minimizing scratches). The metal oxide over the nitride layer is removed, and the nitride layer on the top surface of the metallic structure is thus exposed. At this point the metal oxide layer and the nitride layer are polished together by the CMP process; polishing of the nitride layer causes ammonia to be generated in the slurry. The ammonia is then extracted as a gas from the slurry, and a signal is generated in accordance with the concentration of the extracted ammonia. The CMP process is terminated in accordance with a change in the signal. In a preferred embodiment of the invention, the metal oxide is aluminum oxide, the nitride is aluminum nitride, and the nitride layer (the endpoint-indicating tag) is deposited as a conformal layer on the substrate and the metallic structure.

The CMP process may be terminated in accordance with a change pattern in the ammonia concentration signal. An initial increase in the signal indicates that the nitride layer is being polished, and a subsequent decrease indicates the eventual disappearance of the nitride layer as it is removed from the top surface of the metallic structure.

According to another aspect of the invention, a method is provided for detecting the endpoint for removal by CMP of a metal oxide film overlying a metallic structure. An endpoint-indicating film is first provided between the metal oxide film and the metallic structure, on a top surface of the metallic structure. During CMP of the endpoint-indicating film, a chemical reaction product between the slurry and the endpoint-indicating indicating film is generated in the slurry. The chemical reaction product is extracted as a gas from the slurry, and a signal is generated in accordance with the concentration of the extracted reaction product. A change in the signal indicates the metal oxide CMP endpoint.

At the endpoint of the CMP process, a top surface of the metal oxide film is coplanar with the top surface of the metallic structure, so that the CMP process causes formation of a cloisonné structure. The CMP process may be terminated in accordance with the change in the signal. Specifically, the CMP process may be terminated in accordance with a decrease in the signal, since the decrease indicates nearly complete removal of the endpoint-indicating layer from the top surface of the metallic structure.

It should be noted that the endpoint-indicating layer may be located anywhere within the oxide film, so that the CMP process may be terminated at a predetermined location in the film or at a predetermined film thickness.

DETAILED DESCRIPTION OF THE PREFERRED EMBODIMENTS

It has previously been found that when CMP is performed on a substrate with a target film of silicon oxide ($SiO_2$) over a stopping film of silicon nitride ($Si_3N_4$) using a slurry containing water and fumed silica and having a pH of about 10.5, a chemical reaction occurs when the oxide/nitride interface is reached, resulting in the production of ammonia ($NH_3$). Specifically, when silicon nitride is polished with a slurry which is a mixture of fumed silica, water and potassium hydroxide (KOH), the slurry having a pH of about 10.5, the following reaction occurs:

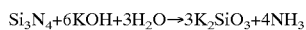

Ammonia is therefore generated in the slurry as a gaseous reaction product when the oxide/nitride interface is reached.

In the present cloisonné CMP process, the same slurry is used; in particular, the pH has the same high value (about 10.5) as in the above-described CMP of silicon nitride.

Figure 1:
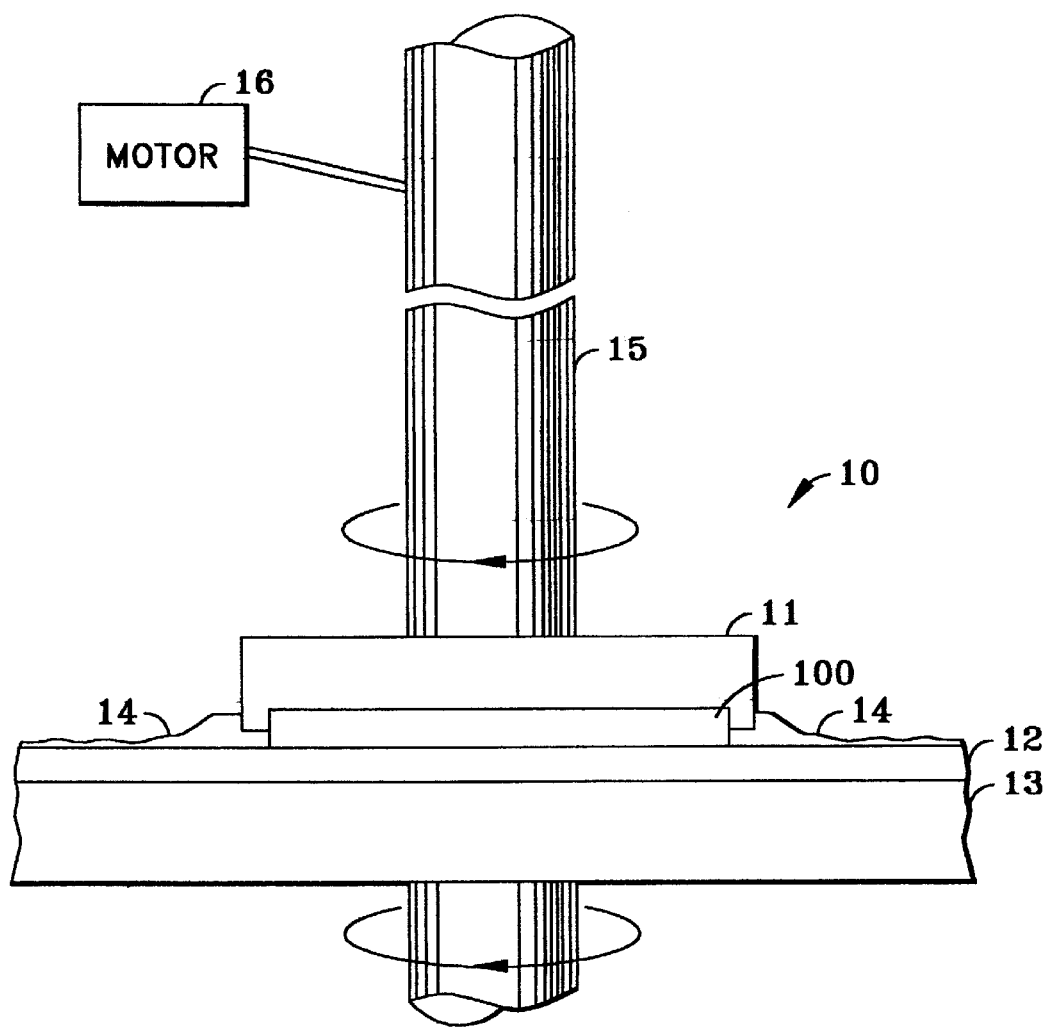
FIG. 1 shows a typical CMP process apparatus.
Figure 2A:
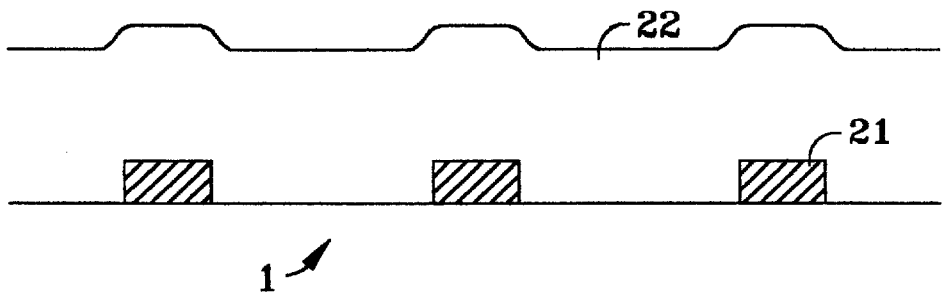
FIGS. 2A and 2B schematically illustrate a CMP film removal process for an aluminum oxide layer.
Figure 2B:
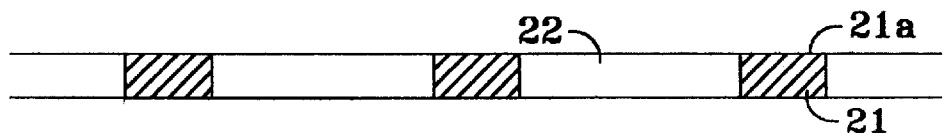
Figure 3A:
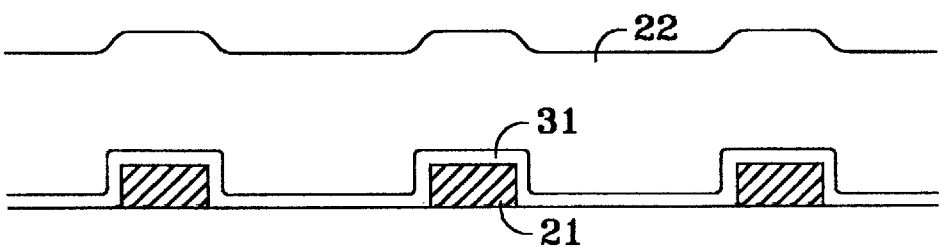
FIGS. 3A–3C schematically illustrate a CMP film removal process for aluminum oxide and aluminum nitride layers, where polishing of the aluminum nitride layer provides a CMP endpoint signal in accordance with the present invention.

In accordance with the present invention, the NiFe structures 21 and underlying films/substrate 1 are coated with a film 31 of aluminum nitride (AlN). The AlN film 31 is then overcoated with the $Al_2O_3$ film 22, as shown in FIG. 3A. As is understood by those skilled in the art, the $Al_2O_3$ deposition process may be modified to add an AlN film by adding a nitrogen-bearing gas in reactive sputtering of $Al_2O_3$.

During polishing in the presence of the high-pH water solution, the AlN film reacts to produce ammonia. The reaction is believed to be as follows:

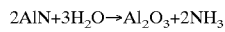

Figure 3B:
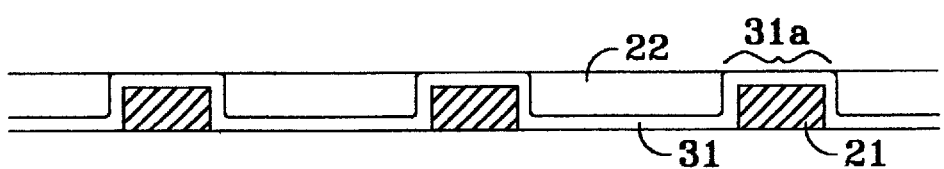

When the $Al_2O_3$ film 22 is planarized and partially removed to expose the top surface 31a of the AlN film 31 where the film overlies the NiFe structure (FIG. 3B), polishing of the AlN film begins. The exposed A lN promptly reacts with water in the slurry to produce ammonia. The ammonia produced is dissolved in the slurry, and because of the relatively high pH it exists primarily in the form of $NH_3$ rather than $NH_4^+$. Accordingly, a change in the level of ammonia in the slurry indicates a change in the degree of exposure of the AlN film 31.

Figure 3C:
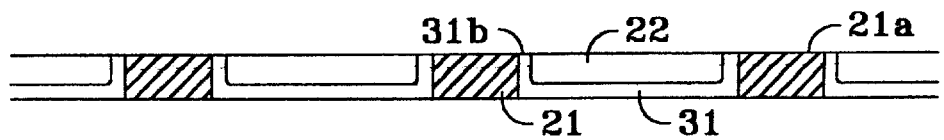

When the AlN film is cleared from the top of the NiFe structure 21, the amount of exposed AlN abruptly decreases; only a small portion 31b is then exposed (FIG. 3C). The level of ammonia in the slurry therefore also decreases, signaling the desired endpoint of the CMP process.

It should be noted that the AlN layer 31 is conformal with the NiFe structures 21; the $Al_2O_3$/AlN interface is therefore first reached during the CMP process as the $Al_2O_3$ removal process exposes the AlN surface 31a on the top surface 21a of NiFe. Stated another way, the ammonia-generating film is self-aligned to the surface on which endpoint is desired.

More generally, the endpoint for removal of any non-AlN-containing film overlying an AlN-containing film can be detected by monitoring the level of ammonia in the slurry.

It should also be noted that the endpoint for removal of a film overlying another film can be detected even if the films are the same type, provided that a reaction with the slurry yields a chemical reaction product with different concentrations from the two films. For example, a nitride contaminant in an oxide layer will react with the slurry to form ammonia. If two oxide layers have different nitride concentrations, the concentrations of ammonia reaction product will be different. This difference in concentration may be detected and used to determine the endpoint for removal of one oxide layer overlying the other oxide layer.

Furthermore, it will be appreciated that an AlN film can serve as an endpoint indicator wherever it is embedded in the $Al_2O_3$ layer.

In order to implement ammonia production in the slurry as part of an endpoint detection scheme suitable for use in manufacturing, real-time and in-situ slurry collection and sampling are required. Preferably, the collection and sampling provide a rapid response with high sensitivity to ammonia, and minimize the effect of interference from other substances in the slurry and in the surrounding air.

Figure 4:
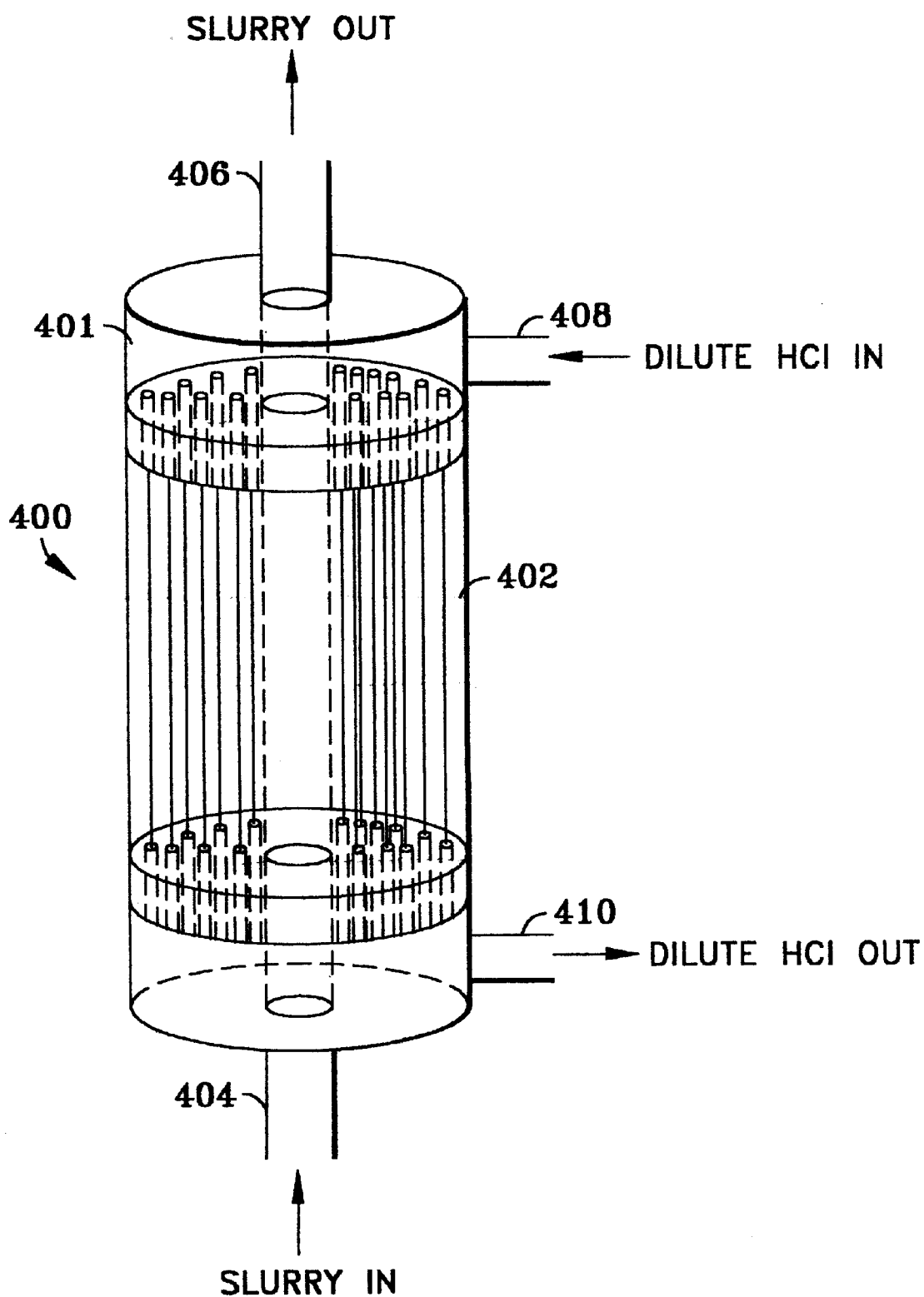
FIG. 4 shows a cross-section of an ammonia scrubber for reducing the pre-polish ammonia concentration in the slurry.

The slurry described above generally contains ammonia prior to being used for polishing. The pre-polish ammonia concentration may be as high as $5.0 \times 10^{-5}$ M. Polishing at a $Al_2O_3$/AlN interface with a low pattern factor (that is, a small area of exposed AlN compared to the total area of AlN and $Al_2O_3$) may generate an ammonia concentration on the order of $1.0 \times 10^{-5}$ M. The change in ammonia concentration due to process endpoint may therefore not be distinguishable from fluctuations in the pre-polish ammonia concentration in the slurry. Accordingly, the pre-polish concentration of ammonia in the slurry must be reduced to obtain the desired sensitivity. This may be done by using an ammonia scrubber 400, shown in FIG. 4. The main component of the scrubber is a Liqui-Cel membrane contactor 401 (model 4×28 from Hoechst-Celanese), containing Celgard™ microporous polypropylene fibers 402. These fibers are hydrophobic and do not allow water-based solutions to penetrate through the fiber membranes, but do allow gas exchange. Slurry from a reservoir (not shown) enters contactor 401 at 404 and flows through contactor 401 on the outside of the fibers, allowing ammonia to permeate to the inside of the fibers before exiting at 406 and recirculating back to 404. To facilitate removal of the ammonia in the slurry, an aqueous HCl solution from another reservoir (not shown) with a pH of approximately 3 is circulated on the inside of the fibers, entering at 408 and exiting at 410, then recirculating back to 408. Ammonia gas from the slurry crossing into this HCl stream is immediately converted to $NH_4^+$ due to the low pH, effectively preventing buildup of $NH_3$ in the interior of the scrubber. The recirculating HCl stream and reservoir can be a sink for a large amount of ammonia from the slurry. The pre-polish ammonia concentration in the slurry may thus be reduced to approximately $2.5 \times 10^{-6}$ M.

Figure 5:
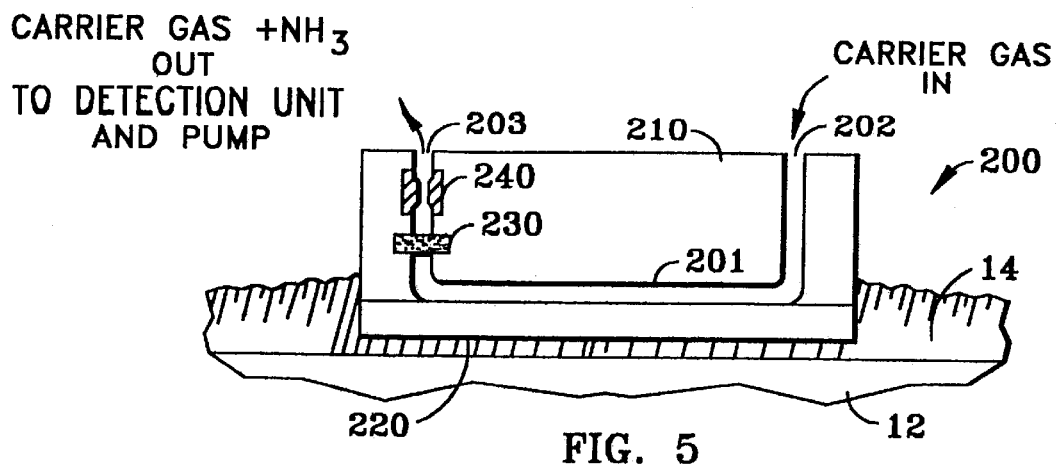
FIG. 5 shows details of an ammonia extraction unit for extracting ammonia from the slurry during polishing.

In order to detect the endpoint of a CMP process by monitoring the concentration of ammonia produced during polishing, the ammonia must be extracted from the slurry. This may be accomplished using an ammonia extraction unit 200, as shown in FIG. 5. The extraction unit 200 has a body 210 (for example, a plastic block) with a channel 201 formed therein. The channel 201 is connected to a source (not shown) of a dry, clean (that is, free of ammonia, nitrogen oxides and amines) carrier gas (e.g. conditioned air) through an inlet connector 202. The channel 201 is also connected through an outlet connector 203 to a detection unit (not shown), which in turn is connected to a vacuum pump (not shown). The bottom of the unit is covered by a hydrophobic, gas permeable membrane 220. The channel 201 thus comprises a gas flow path with a gas-permeable membrane running along a portion of its length. The carrier gas pressure in channel 201 is maintained below atmospheric pressure. The extraction unit is placed in contact with the slurry 14 on top of the polishing pad 12. Ammonia dissolved in the slurry penetrates the gas-permeable membrane 220 and enters the gas stream due to the pressure difference across the membrane. The contact between the extraction unit and the slurry, and between the slurry and the surface of the polishing pad, serves to prevent atmospheric air from entering the gas stream. An additional membrane 230 is placed in the gas stream to prevent slurry from reaching the detection unit in the event the membrane 220 is damaged and slurry thereby enters the channel 201. The dry carrier gas, with the ammonia reaction product entrained therein, is pumped out through a flow restriction device 240.

Figure 6:
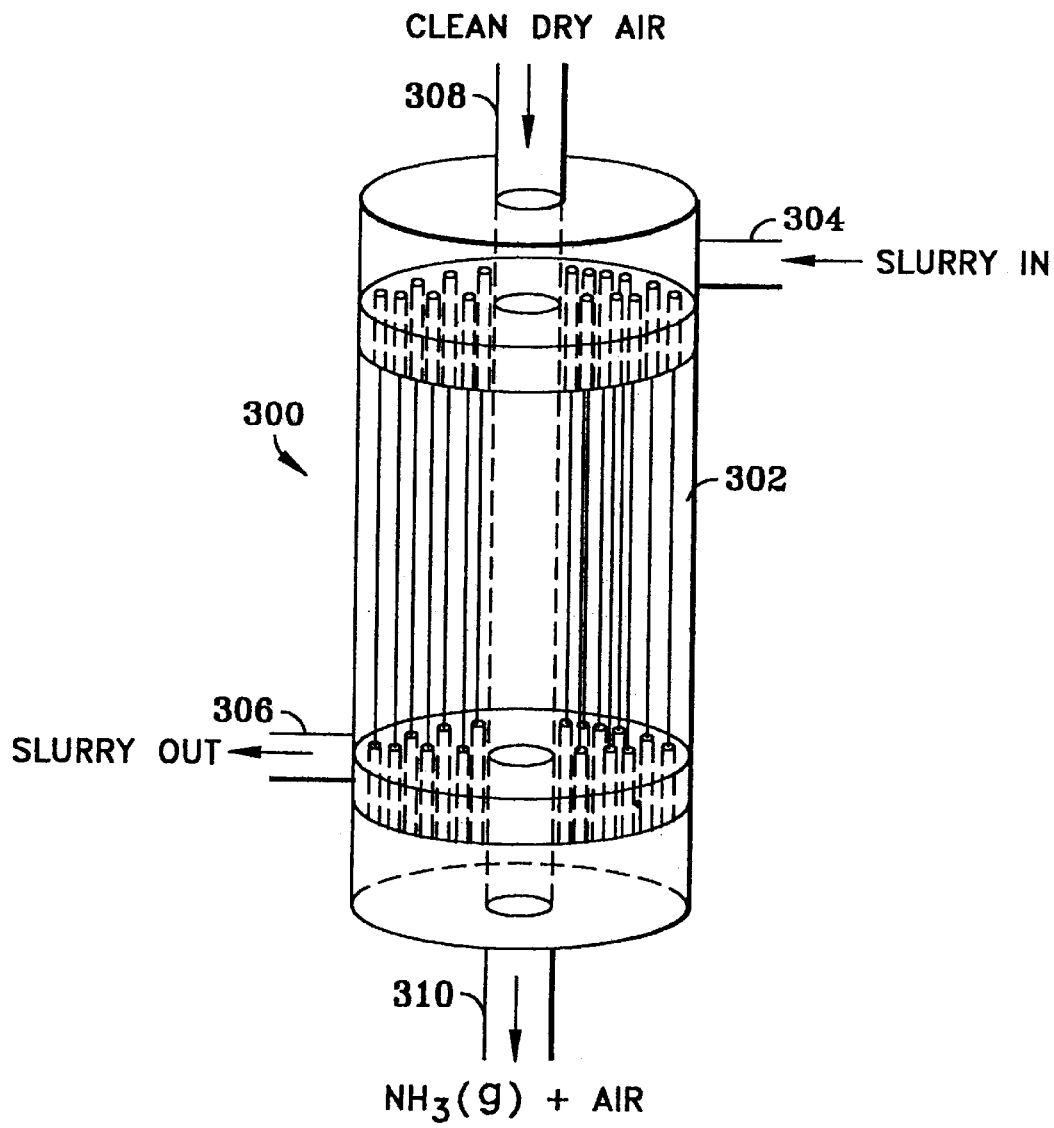
FIG. 6 shows details of an another ammonia extraction unit for extracting ammonia from the slurry during polishing.

An alternate arrangement for an ammonia extraction unit is shown in FIG. 6. The extraction unit 300 may be constructed from polypropylene microporous hollow fibers 302 obtained from a dismantled Liqui-Cel contactor (Hoechst Celanese, model 2.5×8). Fibers 302 allow gas but not liquid to pass from the outside to the inside of the fibers. Slurry is pumped into the extraction unit through inlet 304, on the outside of fibers 302, and exits the extraction unit through outlet 306. A clean, dry carrier gas (e.g. conditioned air) is pumped into the extraction unit through inlet 308 through the inside of the fibers and exits through outlet 310, carrying the ammonia gas molecules. Alternatively, the slurry and carrier gas may be pumped along the outside and inside, respectively, of a hydrophobic gas-permeable membrane. The carrier gas may be pumped through a drier (not shown) containing an ammonia filter before entering extraction unit 300. The carrier gas is pumped at a reduced pressure of approximately 30 Torr to facilitate ammonia transport from the slurry through the fibers and into the gas stream. The reduced pressure also increases the overall flow velocity, thereby reducing the response time for measuring the change in ammonia concentration.

The ammonia-containing gas sample stream is then fed into an analyzer unit 500 which monitors the gas for the presence of ammonia. The analyzer unit outputs a signal 501 indicating the presence of ammonia in the gas stream, thereby indicating the endpoint of the film removal process.

A variety of methods may be used to detect the presence of ammonia in a gas stream with high sensitivity and fast response. One such method, which has been successfully used by the present inventors, involves detection of a chemiluminescence signal. As detailed by Li et al., "Indirect endpoint detection by chemical reaction and chemiluminescence," U.S. patent application No. 09/073,604, the ammonia may be converted to a different product such as nitric oxide, which then emits chemiluminescence upon reacting with ozone. Specifically, a catalytic reaction is used to convert the ammonia, $$NH_3 + O_2 \rightarrow NO + H_2O$$

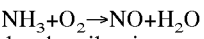

and a chemiluminescent species is produced by reacting the NO product with ozone:

$$NO + O_3 \rightarrow NO_2^* + O_2$$

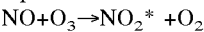

$$NO_2^* \rightarrow NO_2 + h\nu$$

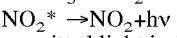

The emitted light is detected by a photomultiplier tube. This technique has been found to detect ammonia at sub-parts-per-billion levels while avoiding interference from other chemicals.

Figure 7:
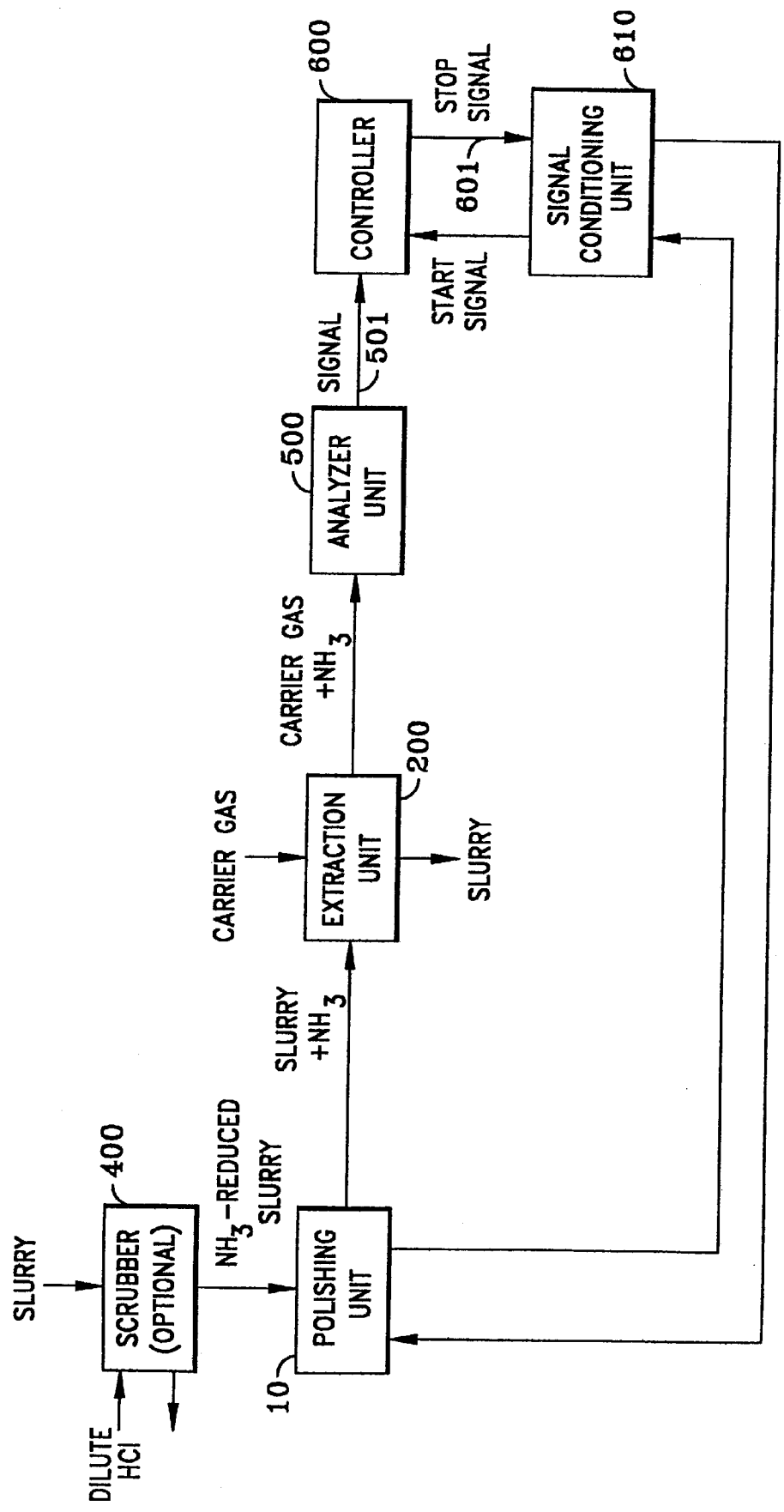
FIG. 7 is a block diagram of an endpoint detection system in accordance with the present invention.

FIG. 7 is a block diagram showing the various units described above, when used to detect the endpoint of an aluminum oxide CMP process with an embedded AlN endpoint indicating layer. The controller 600, which accepts as input the signal 501 from the analyzer unit 500, may advantageously include a computer executing a control program to monitor the CMP process and determine the process endpoint. When the endpoint of the CMP process is reached, the computer may send a control signal 601 to the polishing apparatus 10 to terminate the film removal process. The controller 600 also receives a start signal from the polishing apparatus 10, which triggers the program to begin monitoring the endpoint signal automatically. A signal conditioning unit 610 may be used to ensure that signals reaching the polishing apparatus 10 and controller 600 are at appropriate voltage levels. The use of an endpoint signal for closed-loop process control has been disclosed elsewhere and need not be discussed in detail here.

The actual intensity of the signal 501 depends on several factors, and in general will not be uniform from one workpiece to the next. In particular, the amount of ammonia generated depends critically on the pattern factor (the relative area of exposed AlN as the $Al_2O_3$/AlN interface is reached). Accordingly, the endpoint control signal 601 should not depend directly on the ammonia concentration, but instead on a change in the ammonia concentration. As noted above, an increase in the ammonia concentration indicates that the $Al_2O_3$/AlN interface has been reached (see FIG. 3B), and a subsequent decrease in the ammonia concentration indicates that the exposed surface 31*a* of the AlN has been cleared, thereby exposing the NiFe structure 21 (see FIG. 3C).

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

We claim:

1. A method of fabricating a cloisonné structure in which a top surface of a metal oxide layer is made coplanar with a top surface of a metallic structure formed on a substrate, the method comprising the steps of:

depositing a nitride layer at least on the top surface of the metallic structure;

depositing the metal oxide layer over the metallic structure and the nitride layer;

polishing the metal oxide layer by a chemical-mechanical polishing (CMP) process using a slurry, so that metal oxide over the nitride layer is removed, thereby exposing the nitride layer on the top surface of the metallic structure;

polishing the metal oxide layer and the nitride layer by the CMP process, where polishing of the nitride layer causes ammonia to be generated in the slurry;

extracting the ammonia as a gas from the slurry;

generating a signal in accordance with a concentration of ammonia extracted in said extracting step; and terminating the CMP process in accordance with a change in the signal.

2. A method according to claim 1, wherein the metal oxide is aluminum oxide and the nitride is aluminum nitride.

3. A method according to claim 1, wherein the nitride layer is deposited as a conformal layer on the substrate and the metallic structure.

4. A method according to claim 1, further comprising the step of removing ammonia from the slurry, prior to said polishing steps.

5. A method according to claim 1, wherein the CMP process is terminated in accordance with a decrease in the signal, said decrease indicating removal of the nitride layer from the top surface of the metallic structure to expose said surface.

6. A method according to claim 1, wherein said generating step further comprises:

converting the ammonia extracted in said extracting step to a different chemical product;

causing the chemical product to emit chemiluminescence; and detecting the chemiluminescence to provide said signal.

7. A method for detecting the endpoint for removal of a metal oxide film overlying a substrate, the removal being performed by a chemical-mechanical polishing (CMP) process using a slurry, the method comprising the steps of:

providing an endpoint-indicating film between the metal oxide film and the substrate;

generating in the slurry a chemical reaction product between the slurry and the endpoint-indicating film during CMP thereof;

extracting the chemical reaction product as a gas from the slurry; and generating a signal in accordance with a concentration of the reaction product extracted in said extracting step, wherein a change in the signal indicates the endpoint for removal of the metal oxide film.

8. A method according to claim 7, wherein at the endpoint of the CMP process a top surface of the metal oxide film is coplanar with a top surface of a metallic structure, so that the CMP process causes formation of a cloisonné structure.

9. A method according to claim 7, further comprising the step of terminating the CMP process in accordance with the change in the signal.

10. A method according to claim 9, wherein the CMP process is terminated in accordance with a decrease in the signal, said decrease indicating removal of the endpoint-indicating layer.

11. A method according to claim 7, wherein the endpoint-indicating film includes a nitride of the metal.

12. A method according to claim 11, wherein the metal oxide is aluminum oxide, the nitride is aluminum nitride, and the chemical reaction product is ammonia.

13. A method according to claim 12, wherein a top surface of the metal oxide film is made coplanar with a top surface of a metallic structure by the CMP process, and further comprising the step of terminating the CMP process in accordance with a decrease in the signal, said decrease indicating removal of the aluminum nitride from the top surface of the metallic structure.

14. A method according to claim 7, wherein said step of generating a signal further comprises:

converting the reaction product extracted in said extracting step to a different chemical product;

causing the chemical product to emit chemiluminescence; and detecting the chemiluminescence to provide said signal.

* * * * *